United States Patent
Avelar et al.

(10) Patent No.: US 9,586,835 B2
(45) Date of Patent: Mar. 7, 2017

(54) BOUSSINGAULTITE PRODUCTION PROCESS FROM LIQUID EFFLUENTS CONTAINING MAGNESIUM SULPHATE

(71) Applicant: VALE S.A., Centro, Rio de Janeiro (BR)

(72) Inventors: Angela Nair Avelar, Belo Horizonte (BR); Ruberlan Gomes Da Silva, Belo Horizonte (BR)

(73) Assignee: VALE S.A., Rio de Janeiro (BR)

( * ) Notice: Subject to any disclaimer, the term of this patent is extended or adjusted under 35 U.S.C. 154(b) by 34 days.

(21) Appl. No.: 14/688,869

(22) Filed: Apr. 16, 2015

(65) Prior Publication Data
US 2015/0298985 A1    Oct. 22, 2015

(30) Foreign Application Priority Data
Apr. 17, 2014 (BR) .......................... 102014009507

(51) Int. Cl.
| | |
|---|---|
| C22B 26/22 | (2006.01) |
| C22B 3/46 | (2006.01) |
| C01F 5/40 | (2006.01) |
| C01C 1/24 | (2006.01) |

(52) U.S. Cl.
CPC ............. *C01F 5/40* (2013.01); *C01C 1/24* (2013.01); *C22B 3/46* (2013.01); *C22B 26/22* (2013.01); *C01P 2004/01* (2013.01); *C01P 2004/03* (2013.01); *C01P 2006/82* (2013.01)

(58) Field of Classification Search
CPC ... C22B 26/22; C22B 3/46; C01F 5/40; C01C 1/24
See application file for complete search history.

(56) References Cited

FOREIGN PATENT DOCUMENTS

| | | | | |
|---|---|---|---|---|
| DE | 3320181 A1 | 12/1983 | | |
| EP | 1595860 A3 | * 4/2010 | ............... | C01C 1/18 |
| FR | 514421 A | * 3/1921 | ............... | C01F 5/40 |
| RU | 2455270 C2 | * 7/2012 | ............... | C01C 1/18 |
| WO | WO 2008/013510 A2 | 1/2008 | | |

* cited by examiner

*Primary Examiner* — Timothy Vanoy
(74) *Attorney, Agent, or Firm* — Arent Fox LLP

(57) ABSTRACT

Describes a method of producing a magnesium sulfate and hydrous ammonia double salt or Boussingaultite (($NH_4$)$_2$SO$_4$.MgSO$_4$.6H$_2$O), using as a source of magnesium a liquid effluent rich in magnesium sulfate originally from hydrometallurgical processes for the production of metals such as nickel, copper, rare earths. According to the invention, the process route for the production of Boussingaultite with physical properties suitable for use in fertilizer mixtures involves the steps of precipitating the Boussingaultite double salt, filtration and thermal drying.

19 Claims, 8 Drawing Sheets

BOUSSINGAULTITE PRODUCTION PROCESS FROM LIQUID EFFLUENTS CONTAINING MAGNESIUM SULPHATE

CROSS-REFERENCE TO RELATED APPLICATION

This application is based upon and claims the benefit of priority of the Brazilian Patent Application No. 102014009507-1, filed Apr. 17, 2014. The disclosure of the prior application of which is hereby incorporated in its entirety by reference

FIELD OF THE INVENTION

This invention is related to the recycling of liquid effluents originating from hydrometallurgical processes for the production of a mineral. More specifically, this invention refers to a process for use of a liquid effluent rich in magnesium sulfate (MgSO4), originated from the hydrometallurgical process for the production of metals such as nickel, copper and rare earths, to obtain a double magnesium sulfate and ammonium hydrate salt called Boussingaultite, suitable for use in fertilizer mixtures due to the high water soluble nutrient content, such as magnesium, sulphate and nitrogen.

BACKGROUND OF THE INVENTION

Boussingaultite is a double-sulfate mineral represented by the chemical formula $(NH_4)_2Mg(SO_4)_2 \cdot 6(H_2O)$, which has monoclinic symmetry, forming clear crystals. The mineral Boussingaultite is water soluble, has density of 1.7 g/cm3 and is usually found in nature in regions rich in anthracite.

Boussingaultite production methods are known in the art. One example is the production from magnesite (MgCO3) according to WO 2008/013510. The use of magnesite has the disadvantage of being a very poorly soluble source of magnesium, in the form of carbonate.

Another example is the production method from kieserite (MgSO4.H2O) as a source of magnesium, according to the German patent DE 3320181. Kieserite is a more soluble source of magnesium, however, it is more costly to process, and it results in very hygroscopic salts, a disadvantage in the production of fertilizers.

This invention proposes a new process for the production of Boussingaultite, which does not present the disadvantages of the prior art processes, based on the reuse of wastewater originating from hydrometallurgical processes.

The hydrometallurgical processes for the production of metals, such as nickel, copper and rare earths, have the major drawback of generating liquid effluent rich in magnesium sulfate. This fact requires the execution of one or more stages of wastewater treatment with lime, yielding a solid residue rich in calcium sulfate (CaSO4) and magnesium hydroxide (Mg(OH)2), which must be disposed of in an appropriate location.

This invention refers to a new process for the recovery of the magnesium contained in these liquid effluents, by its precipitation in the form of a double magnesium sulfate and hydrous ammonia salt, with the molecular formula, $(NH_4)_2SO_4 \cdot MgSO_4 \cdot 6H_2O$, being called Boussingaultite.

This invention uses as a source of magnesium, for the possible production of fertilizers, wastewater originated from hydrometallurgical processes which was previously only intended for disposal. Thus, the proposed process presents economic and environmental gains over other procedures known to the state of the art.

GOALS OF THE INVENTION

This invention aims to present a new Boussingaultite production process using as a source of magnesium a liquid effluent rich in magnesium sulfate, originated from hydrometallurgical processes for the production of metals such as nickel, copper and rare earths.

BRIEF DESCRIPTION OF THE INVENTION

This invention consists of a new production process for magnesium sulfate and ammonium hydrate double salt, $(NH_4)_2SO_4 \cdot MgSO_4 \cdot 6H_2O$, also called Boussingaultite, using as a source of magnesium the liquid effluent rich in magnesium sulfate originated from hydrometallurgical processes for the production of metals such as nickel, copper and rare earths.

According to the invention, the process route for the production of Boussingaultite with physical properties suitable for use in fertilizer mixtures involves the steps of precipitating the double salt in Boussingaultite crystals, filtration and thermal drying. The precipitation reaction of Boussingaultite can be represented by the following chemical reaction:

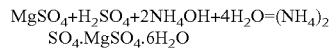

$$MgSO_4 + H_2SO_4 + 2NH_4OH + 4H_2O = (NH_4)_2SO_4 \cdot MgSO_4 \cdot 6H_2O$$

BRIEF DESCRIPTION OF THE FIGURES

This invention is described in detail based on the figures:

FIG. 5 shows an overview of the test sample 1, which is composed primarily of large aggregates of magnesium sulphate and ammonia.

FIG. 6 shows details of the Test Sample 1 aggregates. It is possible to observe the contact of grains, which have an average size of 400-200 µm.

FIG. 7 shows Test Sample 2, with the presence of spicular particles of calcium sulfate.

FIG. 8 shows in detail the calcium sulfate spikes in Sample Test 2.

FIG. 9 shows an overview of the test sample 2, which is composed primarily of aggregates of magnesium sulphate and ammonia. The aggregates do not have a defined form.

FIG. 10 shows, in detail, the magnesium sulfate and ammonia grains in Test Sample 2 aggregates. The grains are inequigranular.

FIG. 11 is an overview of the test sample 3 and shows magnesium sulphate and ammonia aggregates.

FIG. 12 shows the surface detail of the particles of test sample 3, with rugose aspect.

FIG. 13 shows some particles from sample test 3 that have a smooth surface with calcium sulfate spikes.

FIG. 14 shows details of the calcium sulfate particles of Test Sample 3.

DETAILED DESCRIPTION OF THE INVENTION

This invention consists of a new production process for magnesium sulfate and ammonium hydrate double salt, $(NH_4)_2SO_4 \cdot MgSO_4 \cdot 6H_2O$, also called Boussingaultite, using as a source of magnesium the liquid effluent rich in magnesium sulfate originated from hydrometallurgical processes for the production of metals such as nickel, copper and rare earths.

According to the invention, the process route for the production of Boussingaultite with physical properties suitable for use in fertilizer mixtures involves the steps of precipitating the Boussingaultite double salt, filtration and thermal drying.

The precipitation reaction of Boussingaultite can be represented by the following chemical reaction: $MgSO_4 + H_2SO_4 + 2NH_4OH + 4H_2O = (NH_4)_2SO_4 \cdot MgSO_4 \cdot 6H_2O$ To perform the laboratory experiments that culminated in the process route of this invention, we investigated several Boussingaultite recovery methods. In order to ensure that there was sufficient volume of liquid effluent samples rich in magnesium sulfate for testing and, additionally, that these samples have the same chemical composition, we opted for the preparation and use of a synthetic solutions rich in magnesium. These synthetic solutions reproduce the wastewater originated from hydrometallurgical processes for the production of metals such as nickel, copper or rare earths.

Laboratory experiments begin with the initial preparation of a synthetic standard solution of magnesium sulfate which contains magnesium sulfate in a concentration of 5% to 30% w/w in deionized water. Additionally, it is necessary to prepare an ammonium hydroxide solution in a concentration of 15% to 40% w/w, also with deionized water.

Sulfuric acid is added to the synthetic solution of magnesium sulfate until the pH is in a range from 3.0 to 4.0. Then an ammonium hydroxide solution is added until the pH is in the range from 4.0 to 6.0. Sulfuric acid can be dripped on the surface of the solution while the ammonium hydroxide solution should be added to the bottom of the flask. This procedure of adding sulfuric acid and ammonium hydroxide solution is repeated, sequentially and with pH adjustment until the desired stoichiometric quantities of reagents for the formation of the double salt is consumed, a characteristic of the end of the reaction.

Figure 1:
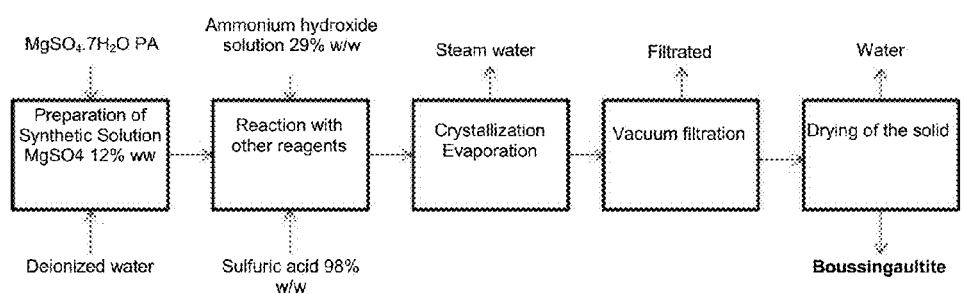
FIG. 1 is a flowchart containing the main steps carried out on a laboratory scale to obtain Boussingaultite, as described by Example 1.

After the end of the reaction the evaporation of part of the solvent from the reaction medium is made, by heating at a temperature of 80±5 C, so there is crystallization, that is, the formation of crystals of the double salt of interest. The solid product obtained is further filtered in vacuum, dried at a temperature of 60±5° C. and physicochemically characterized. The steps of the Boussingaultite production process in laboratory scale are represented in the flowchart of FIG. 1.

The final solid obtained according to the invention process has physical properties suitable for use in fertilizer mixtures, among which we highlight the appropriate particle size (between 1 and 4 mm), good fluidity and absence of hygroscopicity.

The levels of nutrients present in the water-soluble end product are from 6 to 10% of total nitrogen, 6 to 10% of magnesium and 55 to 60% of sulphate. The moisture content (free water) in the final product is from 0.5 to 1.5%, and the free acidity value is from 0.1 to 0.3%.

Figure 2:
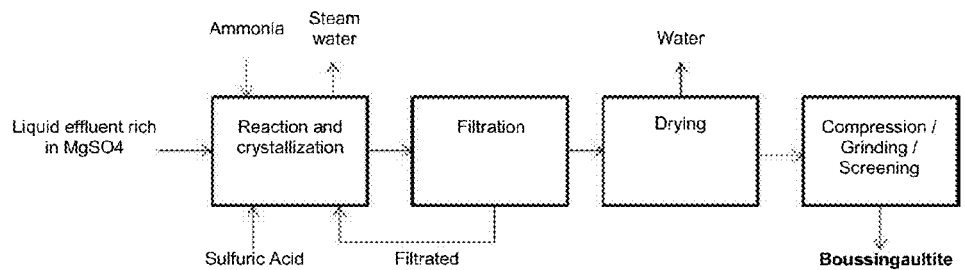
FIG. 2 is a flowchart proposing major unit operations for the production of Boussingaultite on an industrial scale.
Figure 3:
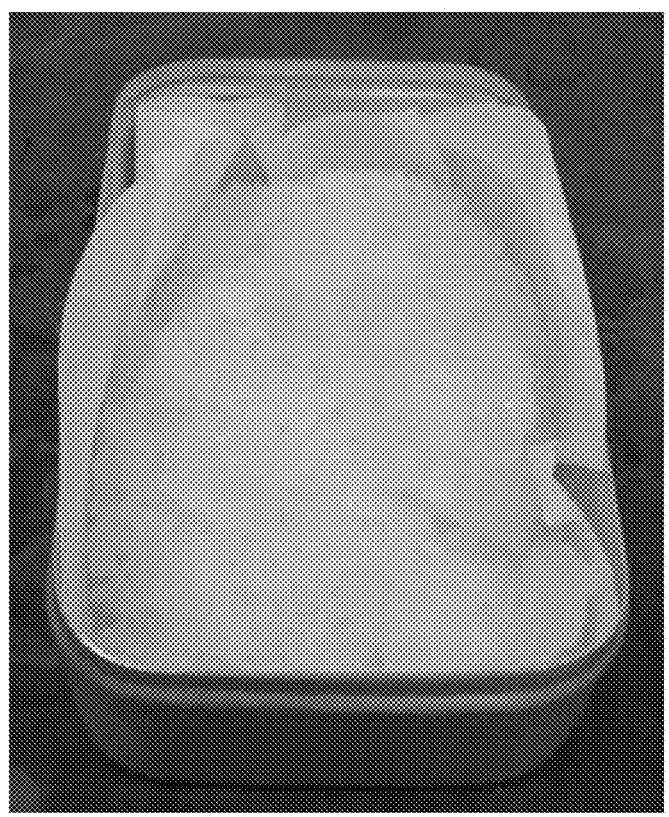
FIG. 3 shows the Boussingaultite obtained according to Example 1, after drying in an oven.
Figure 4:
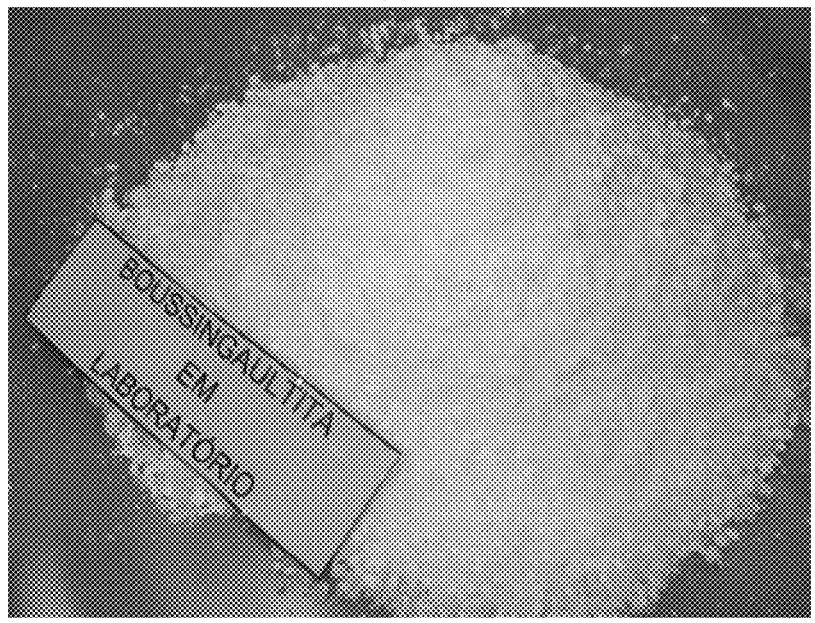
FIG. 4 (panels 1 and 2) shows details of the Boussingaultite obtained according to Example 1 after grinding.
Figure 4:
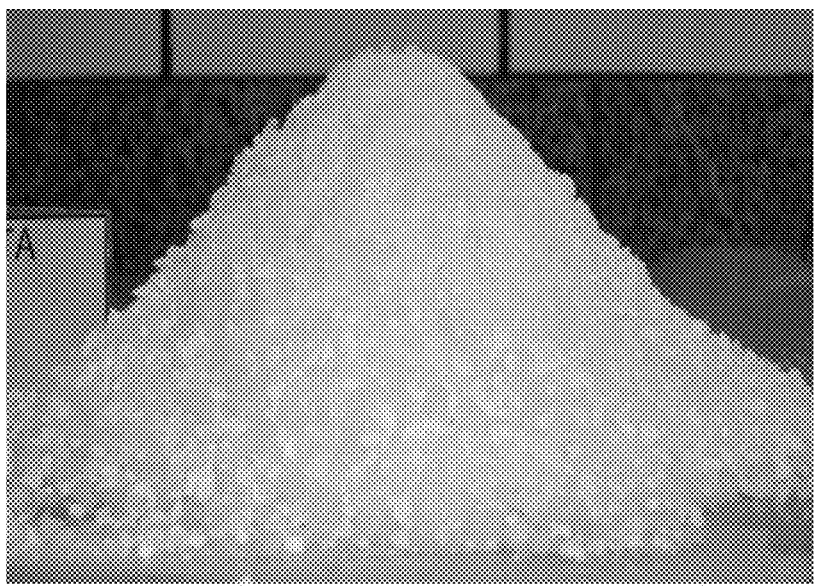
Figure 5:
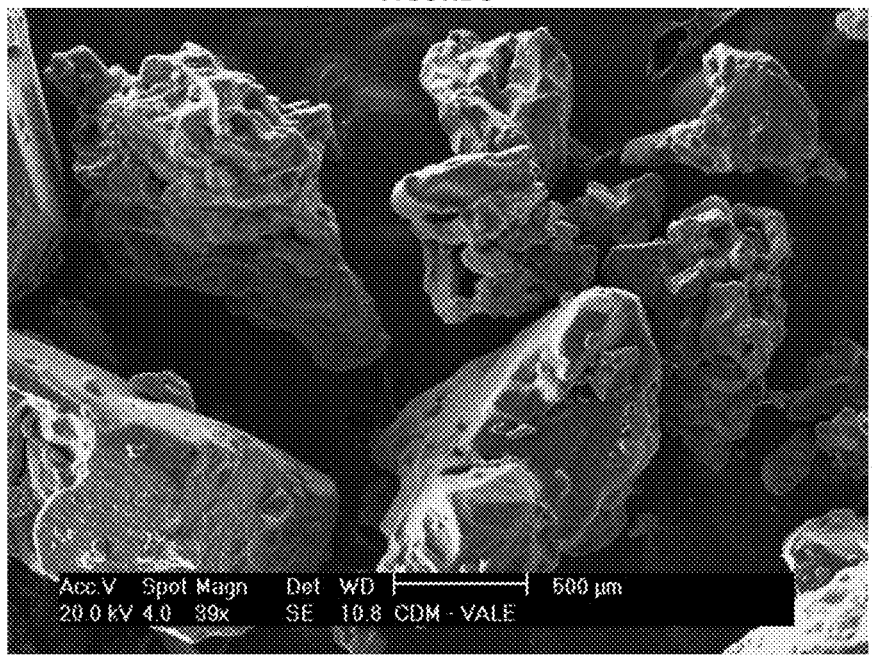
FIGS. 5 to 14 are images obtained by scanning electron microscopy (SEM) of Boussingaultite samples obtained according to Example 1.
Figure 6:
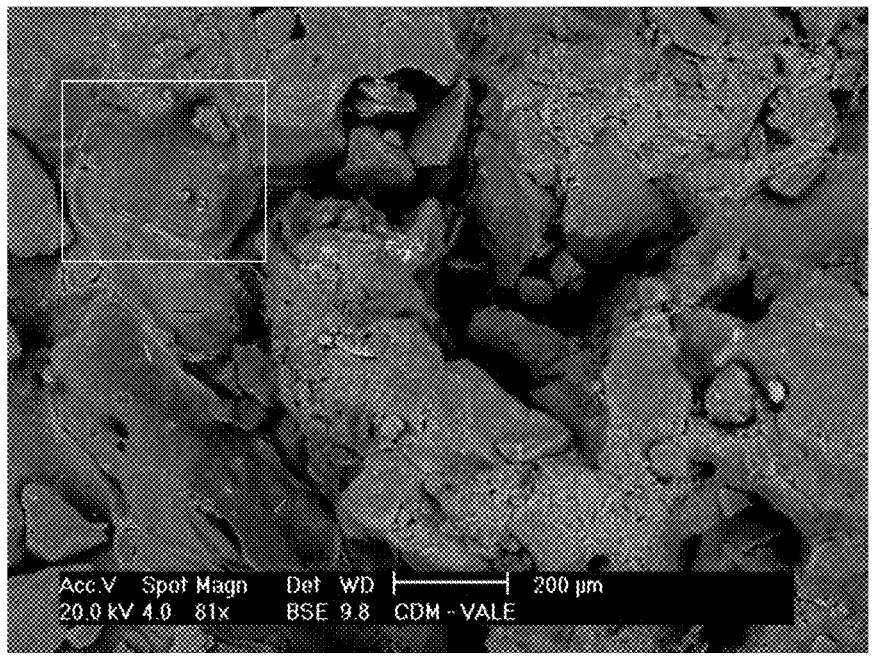
Figure 7:
Figure 8:
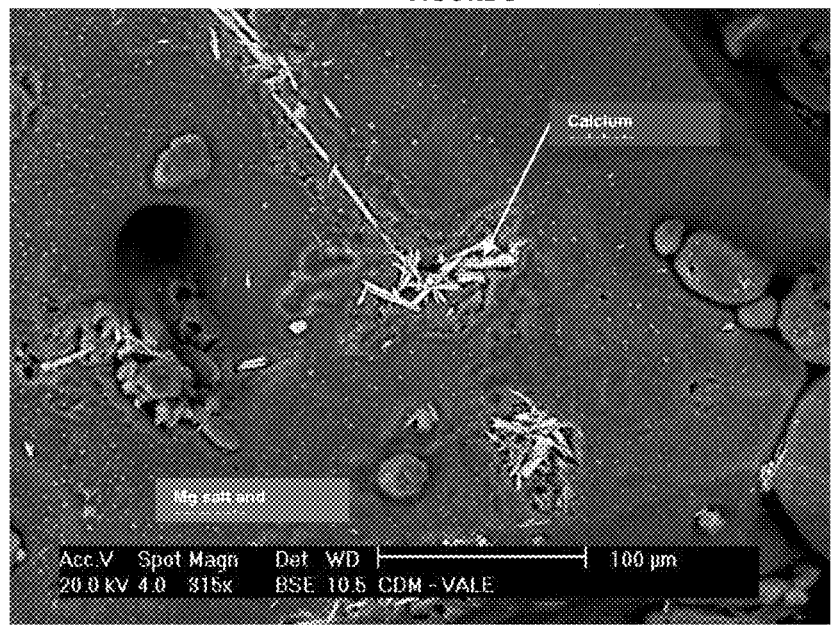
Figure 9:
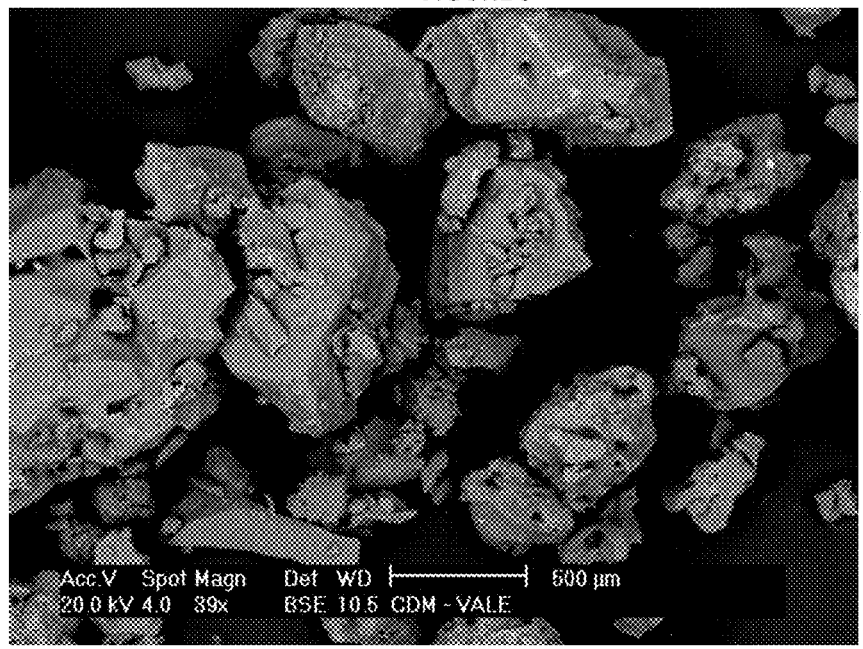
Figure 10:
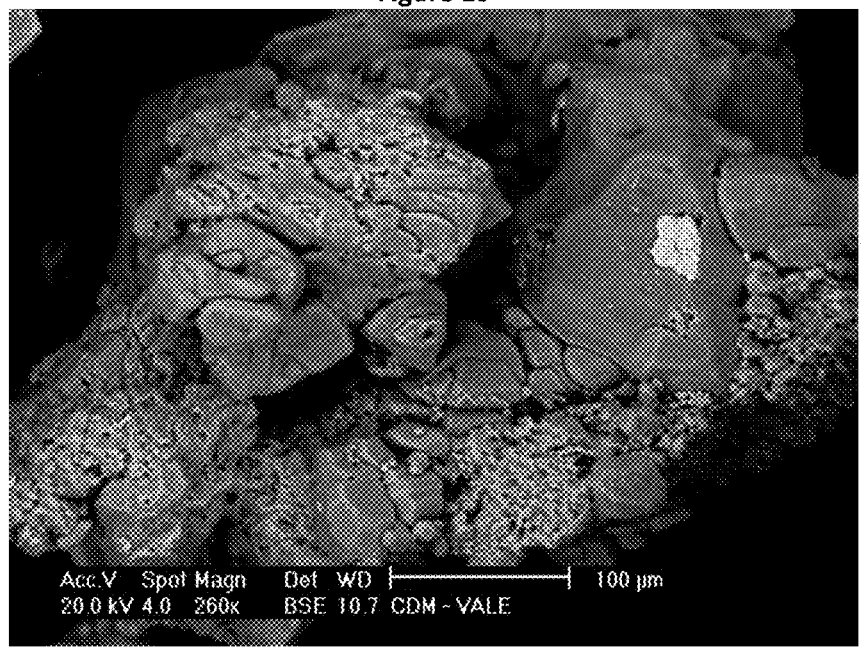
Figure 11:
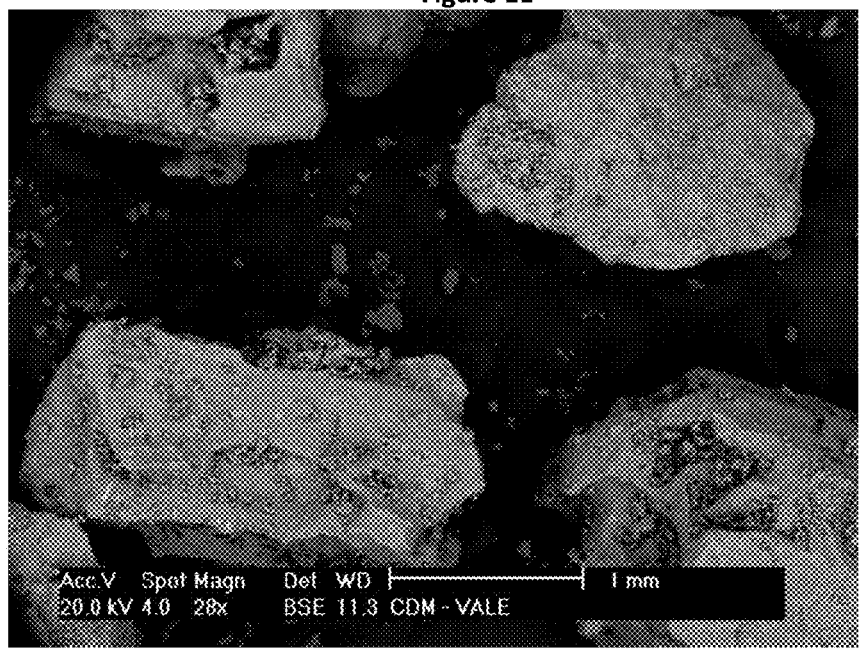
Figure 12:
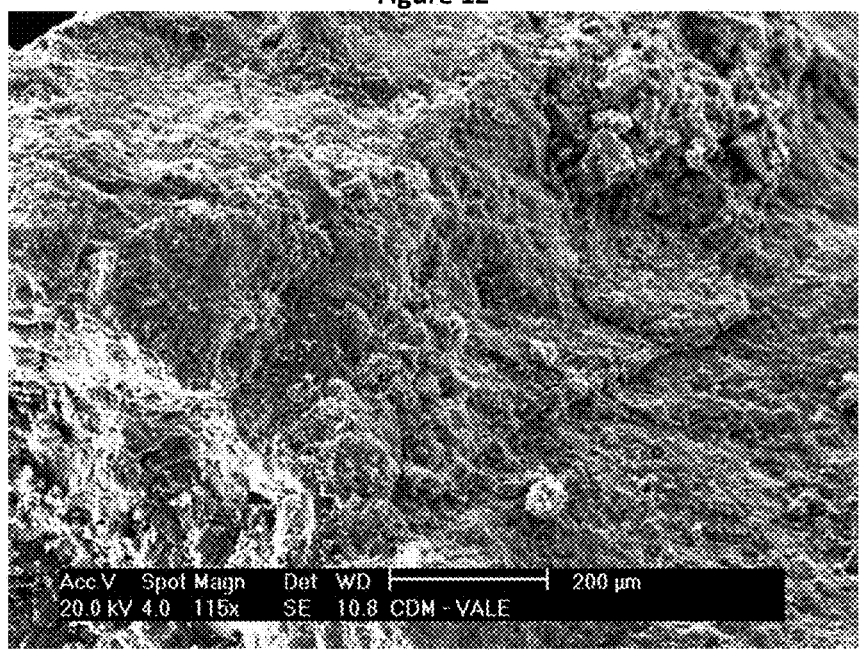
Figure 13:
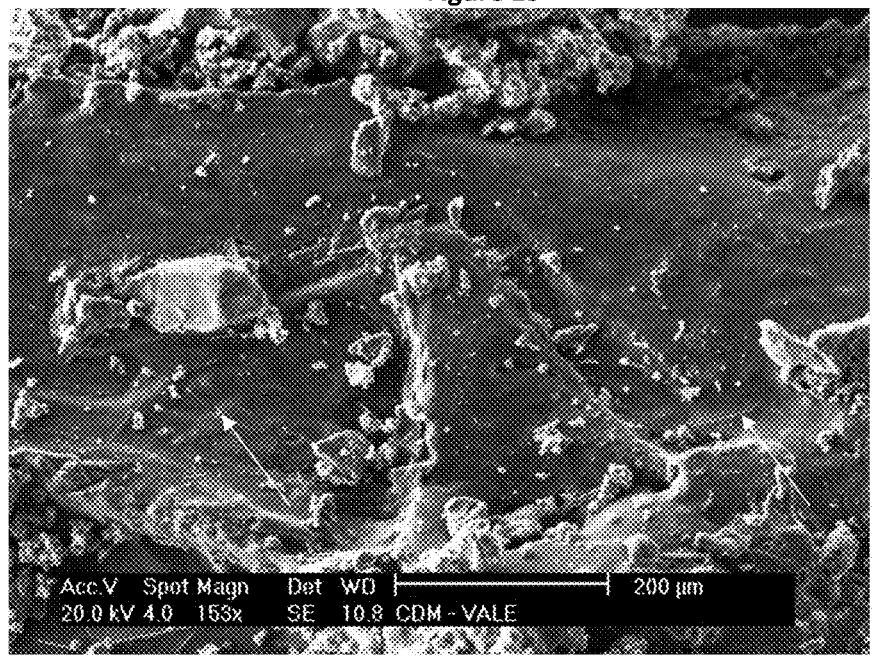
Figure 14:
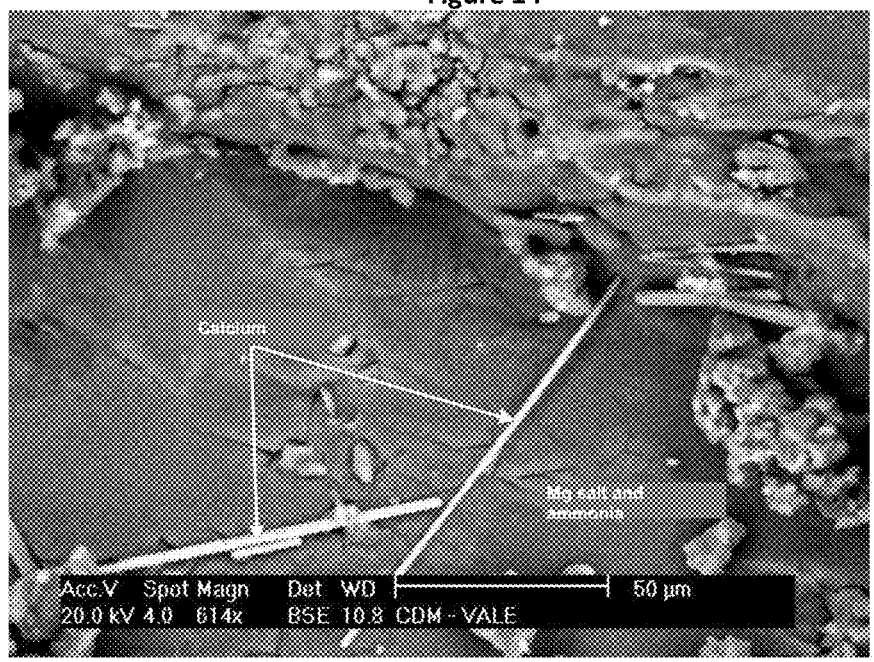

In a second embodiment of this invention a process route for industrial production of Boussingaultite is described. The precipitation reaction of the magnesium sulphate double salt and ammonium hydrate is the same, however, operating conditions compatible with a process on an industrial scale are observed. In FIG. 2 we present the flow chart in which there are listed the main unit operations planned for the production process on an industrial scale:

Reaction of the liquid effluent rich in magnesium sulfate (originated from hydrometallurgical processes for the production of metals such as nickel, copper, rare earths) with sulfuric acid and ammonia into the reactor with controlled heat to allow for evaporation and crystallization;

Filtration with return of the filtrate to the reactor and purge contaminants;

Thermal drying of the obtained solid;

Compression ensuring average particle size of 2 to 4 mm-preferably 3 mm, and appropriate particle size distribution;

Grinding and screening with return of fines for compaction.

Having described the preferred embodiment examples of the invention, it is noteworthy that the protection scope given hereby encompasses any modifications apparent to one skilled in the art, and all other reasonable alternative ways to implement the invention, with such scope being defined and limited only by the content of the set of claims attached.

EXAMPLES

Example 1

Production Process of Boussingaultite on a Laboratory Scale using Synthetic Solution Rich in Magnesium For the preparation of 1 L of synthetic magnesium sulphate solution 12% w/w there were used 239.79 g of hydrated magnesium sulfate (MgSO4.7H2O) with 99% purity and 760.21 g of deionized water mixed in a glass beaker with mechanical stirring. This synthetic resulting solution had a pH of 7.1, density 1,120 t/m3 and viscosity of 8.0 cP (measurements at 25° C.).

Three assays were conducted in a glass beaker with mechanical stirring, and the main results are illustrated in Table 1. Sulfuric acid 98% was added slowly (by drops) to the synthetic magnesium sulfate solution. A similar procedure was employed for the addition of 29% ammonium hydroxide, with the latter reagent being added to the beaker bottom. After precipitation, the set was placed on a heating plate to provide a full forced evaporation of water, maintaining the temperature in the range 80±5° C. The wet salt obtained after evaporation was dried for several hours (until constant weight) in an oven maintained at 60° C.

TABLE 1

Main process parameters and results obtained in
the tests of Boussingaultite production.

|  | Test 1 | Test 2 | Test 3 | Average |
|---|---|---|---|---|
| PRECIPITATION STEP | | | | |
| Initial mass of the MgSO4 solution 12% w/w (g) | 1,000 | 1,000 | 1,000 | 1,000 |
| Initial pH of the MgSO4 solution 12% w/w | 7.1 | 7.2 | 6.9 | 7.1 |
| Initial temperature of the MgSO4 solution (° C.) | 22 | 22 | 30 | 25 |
| Resulting final solution weight (g) | 1206 | 1204 | 1202 | 1204 |
| Resulting pH of the final solution | 2.4 | 2.4 | 2.4 | 2.4 |
| Temperature at the end of the precipitation (° C.) | 56 | 58 | 58 | 57 |
| EVAPORATION AND DRYING STEPS | | | | |
| Mass of wet product after evaporation (g) | 377 | 374 | 352 | 368 |
| Water evaporated (g) | 829 | 830 | 850 | 836 |
| Salt moisture after evaporation (%) | 9 | 7 | 5 | 7 |
| Mass of the dried product after drying at 60° C. (g) | 342 | 346 | 332 | 341 |
| Mass yield (%) | 97.5 | 98.7 | 94.7 | 97.0 |

As shown in Table 1, the pH of the solution after the reaction amounted to around 2.4, as expected for a strong acid and weak base salt such as Boussingaultite.

Based on the stoichiometric amounts of reactants, we calculated the theoretical mass of 351.18 g $(NH_4)_2SO_4 \cdot MgSO_4 \cdot 6H_2O$ produced and, using this quantity, mass yields were calculated and are listed in Table 1. It was found, therefore, that the mass yield is above 94%.

The main physic-chemical characteristics of the final solid product (Boussingaultite) obtained in tests 1, 2 and 3 are shown in Table 2. The average contents of nitrogen, magnesium and sulfate found were, respectively, 8.3%, 8.5% and 58.4%. Nitrogen and sulfate contents did not present significant variations (maximum 10%) compared to the expected levels, which are 7.7% of nitrogen and 52.7% of sulfate. On the other hand, the average content of magnesium was found to be 29% higher than expected, which was 6.6%, indicating potential problems in the analytical method/procedure used to determine this element. Despite not carrying out the analysis of ammonia nitrogen content, it can be concluded from the results of X-ray diffraction that much of the nitrogen is in the ammonium form, that is, as $NH_4^+$.

TABLE 2

Physical-chemical characteristics of the products obtained.

|  | Test 1 | Test 2 | Test 3 | Average |
|---|---|---|---|---|
| Total nitrogen (%) | 8.19 | 8.24 | 8.56 | 8.33 |
| Magnesium (%) | 8.51 | 8.57 | 8.47 | 8.52 |
| Sulfate (%) | 57.7 | 57.8 | 59.7 | 58.4 |
| Humidity (%) | 1.33 | 1.57 | 0.50 | 1.10 |
| Free acidity (%) | 0.17 | 0.15 | 0.15 | 0.16 |

The average humidity, or free water average content, was 1.1%, which is close to what could be obtained industrially. The free water content only measures the amount of surface water and does not interfere with crystallization water of the product.

The average content of free acidity was only 0.16%, indicating the absence of free acid in the product, that is, there is no residual traces of sulfuric acid (unreacted) in the final product.

The tests indicated the possibility of obtaining a product of suitable particle size, that is, grains between 1 and 4 mm. This range is ideal for use in granular fertilizer mixes. Therefore, it is concluded that the particle size adjustment process involving the steps of compacting, crushing and screening are valid for the purposes of this invention.

Products obtained in the trials were exposed outside for about 30 days (environment natural condition) at an average temperature of 26° C. and relative humidity of 63%, and did not significantly absorb moisture from the air, showing that they are non-hygroscopic and do not require an additional coating step with additive in the manufacturing process.

The mineralogical characterization of the obtained solids (Boussingaultite) was made through microanalysis by energy dispersive spectrometer (EDS), images on the Scanning Electron Microscope (SEM) and determination of crystalline phases by X-ray diffraction (XRD).

The analysis by X-ray diffractometry were performed in the equipment PHILIPS model X'Pert with source Cu Kα using curved graphite crystal monochromator and angular range varying from 2 to 70° 2θ. The observations and microanalysis by EDS were performed using electron scan microscope XL-30 PHILIPS and energy dispersive spectrometer-Oxford-Inca Energy. The main results of X-ray diffraction are shown in Table 3.

Images from electron microscopy (SEM) of the products are in FIGS. 5-14. It is observed that in all trials, the precipitated samples are mainly composed of magnesium sulfate and ammonia, confirming the stoichiometry proposed by this invention ($MgSO_4 + H_2SO_4 + 2NH_4OH + 4H_2O = (NH_4)_2SO_4 \cdot MgSO_4 \cdot 6H_2O$). Contaminants phases or traits are shown as the other compounds listed in Table 3.

Sometimes, it is observed in the mentioned images the presence of calcium sulfate spikes (white arrows in FIGS. 7, 8, 13 and 14). In general, the double magnesium sulfate and ammonia salt is presented in the form of aggregates, with inequigranular grain compounds of magnesium sulfate and ammonia (FIG. 6), the size of these grains can reach up to 500 μm.

TABLE 3

Results of X-rays diffraction for the evaluated samples.

| Compound | Chemical formula | Test 1 | Test 2 | Test 3 |
|---|---|---|---|---|
| Bi-sulfatodi-ammonium-magnesium (VI)hexahydrate | $Mg(NH_4)_2(SO_4)_2(H_2O)_6$ | xxx | xxx | xxx |
| Grafiite-2H | C | pp | x | — |
| Di-propionamide | $C_6H_{13}NO_2$ | pp | pp | — |
| Magnesium benzene-sulfonate | $C_{12}H_{10}MgO_6S_2$ | pp | — | — |
| P-Nitrofenetol | $C_8H_9NO_3$ | — | pp | — |
| Á-poly (D-lactide) | $(C_3H_5O_3)_x$ | — | pp | — |
| Acidcycle--cyclohexane-carboxylic | $C_7H_{12}O_2$ | — | — | x |
| 5-(4-methoxyphenyl) tetrazole | $C_8H_8N_4O$ | — | — | pp |
| 1-1':3'-1''':2''-1''':3''-1'''' quinquefenil | $C_{30}H_{22}$ | — | — | pp |

Legend:
xxx—predominant;
x—present;
pp—possible presence

The invention claimed is:
1. A method of producing a magnesium sulfate and hydrated ammonium double salt, with the formula $MgSO_4 \cdot (NH_4)_2SO_4 \cdot XH_2O$ (Boussingaultite), comprising:
   a) providing a synthetic solution of magnesium sulfate or a liquid effluent comprising magnesium sulfate;

b) adding sulfuric acid to the solution of step a) until the pH is in the range from 3.0 to 4.0 to form a reaction medium;

c) adding ammonium hydroxide or ammonia to the reaction medium of step b) until the pH is in the range from 4.0 to 6.0;

d) sequentially repeating steps b) and c) until the consumption of stoichiometric amounts of the reactants for the formation of Boussingaultite solid;

e) crystallizing the Boussinqaultite solid by the evaporation of water from the reaction medium by heating at a temperature of 80±5° C., and filtering.

2. The production method according to claim 1, wherein the liquid effluent according to step a) originates from hydrometallurgical processes for the production of metals.

3. The production method according to claim 1, wherein the stoichiometric amounts of reagents used in step d) are according to the stoichiometric balance $MgSO4+H2SO4+2NH4OH+4H2O=(NH4)2SO4.MgSO4.6H2O$.

4. The production method according to claim 1, further comprising compacting, crushing, and screening.

5. The production method according to claim 1, wherein the average content of nitrogen, magnesium, and sulfate in the final product is respectively 6-10%, 6-10% and 55-60%.

6. The production method according to claim 1, wherein the maximum moisture content or free water in the final product is 0.5-1.5%.

7. The production method according to claim 1, wherein the free acidity value in the final product is 0.1-0.3%.

8. The production method according to claim 1, wherein the liquid effluent according to step a) originates from hydrometallurgical processes for the production of nickel, copper, or rare earths.

9. The production method according to claim 4, wherein the solids obtained after the compacting, the crushing, and the screening are in the form of grains with a grain size in the range from 1 to 4 mm.

10. A method of producing a magnesium sulfate and hydrated ammonium double salt, with the formula $MgSO4.(NH4)2SO4.XH2O$ (Boussingaultite) comprising:

adding sulfuric acid to a synthetic solution of magnesium sulfate until the pH is in the range from 3.0 to 4.0 to form a reaction medium;

adding ammonium hydroxide to the reaction medium until the pH is in the range from 4.0 to 6.0;

sequentially repeating the adding of the sulfuric acid to the synthetic solution of magnesium sulfate and the adding of the ammonium hydroxide to the reaction medium until the consumption of stoichiometric amounts of the reactants for the formation of Boussingaultite solid;

crystallizing the Boussingaultite solid by the evaporation of water from the reaction medium by heating at a temperature of 80±5° C.; and filtering.

11. The production method according to claim 10, wherein the average content of nitrogen, magnesium and sulfate in the final product is respectively 6-10%, 6-10% and 55-60%.

12. The production method according to claim 10, wherein the maximum moisture content or free water in the final product is 0.5-1.5%.

13. The production method according to claim 10, wherein the free acidity value in the final product is 0.1-0.3%.

14. A method of producing a magnesium sulfate and hydrated ammonium double salt, with the formula $MgSO4.(NH4)2SO4.XH2O$ (Boussingaultite) comprising:

adding sulfuric acid to a liquid effluent comprising magnesium sulfate until the pH is in the range from 3.0 to 4.0 to form a reaction medium;

adding ammonium to the reaction medium until the pH is in the range from 4.0 to 6.0;

sequentially repeating the adding of the sulfuric acid to the liquid effluent and the adding of the ammonium to the reaction medium until the consumption of stoichiometric amounts of the reactants for the formation of Boussingaultite solid;

crystallizing the Boussingaultite solid by the evaporation of water from the reaction medium, and filtering; and compacting, crushing and screening solids obtained from the crystallizing.

15. The production method of claim 14, wherein the liquid effluent according to the adding of the sulfuric acid to the liquid effluent originates from hydrometallurgical processes for the production of metals.

16. The production method according to claim 14, wherein the liquid effluent according to the adding of the sulfuric acid to the liquid effluent originates from hydrometallurgical processes for the production of nickel, copper, or rare earths.

17. The production method according to claim 14, wherein the average content of nitrogen, magnesium, and sulfate in the final product is respectively 6-10%, 6-10% and 55-60%.

18. The production method according to claim 14, wherein the maximum moisture content or free water in the final product is 0.5-1.5%.

19. The production method according to claim 14, wherein the free acidity value in the final product is 0.1-0.3%.

* * * * *